United States Patent
Miyawaki et al.

(10) Patent No.: US 8,389,098 B2
(45) Date of Patent: Mar. 5, 2013

(54) OPTICAL INFORMATION RECORDING MEDIUM AND RECORDING/REPRODUCING METHOD THEREFOR

(75) Inventors: Manami Miyawaki, Kanagawa (JP); Yuji Kuroda, Tokyo (JP); Takashi Shimouma, Kanagawa (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/808,320

(22) PCT Filed: Oct. 7, 2009

(86) PCT No.: PCT/JP2009/067490
§ 371 (c)(1),
(2), (4) Date: Jun. 15, 2010

(87) PCT Pub. No.: WO2010/044363
PCT Pub. Date: Apr. 22, 2010

(65) Prior Publication Data
US 2010/0278032 A1    Nov. 4, 2010

(30) Foreign Application Priority Data
Oct. 15, 2008 (JP) ................... 2008-266222

(51) Int. Cl.
*B32B 3/02* (2006.01)
(52) U.S. Cl. ............... 428/64.1; 428/64.4; 428/64.5; 430/270.13
(58) Field of Classification Search .......... 428/64.4, 428/64.5; 430/270.13
See application file for complete search history.

(56) References Cited

U.S. PATENT DOCUMENTS

| 6,605,330 | B2 * | 8/2003 | Tyan et al. .............. 428/64.1 |
| 7,407,697 | B2 * | 8/2008 | Nishihara et al. ........ 428/64.1 |
| 2003/0099805 | A1 | 5/2003 | Tyan et al. |
| 2008/0175138 | A1 | 7/2008 | Miyagawa |
| 2009/0268579 | A1 | 10/2009 | Miyawaki et al. |

FOREIGN PATENT DOCUMENTS

| EP | 1 310 953 A2 | 5/2003 |
| JP | 54 7548 | 4/1979 |

(Continued)

OTHER PUBLICATIONS

Search Report issued Feb. 3, 2012 in European Patent Application No. 09820541.2.

*Primary Examiner* — Elizabeth Mulvaney
(74) *Attorney, Agent, or Firm* — Oblon, Spivak, McClelland, Maier & Neustadt, L.L.P.

(57) ABSTRACT

An optical information recording medium in which recorded information is stably stored for long time in the initial state, signals are not deteriorated by a laser beam for reproduction at the time of signal reproduction, the quality does not change in normal long-term storage, the write characteristic is held, a manufacturing cost is reduced, a margin in the manufacture process is assured, and excellent recording/reproducing characteristics are obtained in the wide range of linear speeds and recording powers is provided. An optical information recording medium 1 is formed by sequentially stacking a first information recording layer 11, an intermediate layer 12, a second information recording layer 13, and a protection layer 14 on a substrate 10. As a material of a recording layer 13b of the second information recording layer 13, a material having a composition expressed by $[(ZnS)_x(SiO_2)_{1-x}]_y(Sb_zX_{1-z})_{1-y}$ (where $0<x\leq1.0$, $0.3\leq y\leq0.7$, $0.8\leq z\leq1.0$, and X is at least one element selected from the group consisting of Ga, Te, V, Si, Zn, Ta, Sn, and Tb) is used.

H

12 Claims, 8 Drawing Sheets

1

FOREIGN PATENT DOCUMENTS

| | | |
|---|---|---|
| JP | 62 204442 | 9/1987 |
| JP | 3066088 | 5/2000 |
| JP | 2003 72244 | 3/2003 |
| JP | 2003 182237 | 7/2003 |
| JP | 2004 95098 | 3/2004 |
| JP | 2005 125726 | 5/2005 |
| JP | 2005 129192 | 5/2005 |
| JP | 2006 281751 | 10/2006 |
| WO | 2006 043356 | 4/2006 |

* cited by examiner

OPTICAL INFORMATION RECORDING MEDIUM AND RECORDING/REPRODUCING METHOD THEREFOR

TECHNICAL FIELD

The present invention relates to an optical information recording medium and a recording/reproducing method therefor and, more particularly, is suitably applied to a recordable optical information recording medium.

BACKGROUND ART

Heretofore, in an optical information recording medium such as a CD (Compact Disc) or DVD (Digital Versatile Disc), an organic coloring material has been mainly used as the material of a recordable optical information recording medium. The reason is that it is relatively easy to maintain compatibility with a ROM (Read Only Memory) demanded to have relatively high reflectance from the viewpoint of standard in a wavelength region of a laser beam used for recording/reproduction in the case of using the organic coloring material. Further, since a recordable optical information recording medium is obtained only by a simple process of spin-coating an organic coloring material and, after that, forming a reflection layer by sputtering, it is advantageous also from the viewpoint of manufacture cost of facility investment or the like.

However, when the wavelength of a laser beam used for recording and reproduction becomes shorter and a laser beam (having a wavelength of about 400 nm) of a wavelength range of blue-violet comes to be used, the circumstances are changing. Specifically, it is not easy to synthesize an organic coloring material which can be adapted to the laser beam having the wavelength from the viewpoints of recording sensitivity and signal characteristics. The existing simple layer configuration of the optical information recording medium is also not easily adapted to the laser beam. Further, it has become apparent that unmaintained uniformity between lands and grooves due to manufacture of the recordable optical information recording medium by spin coating is disadvantageous also from the viewpoint of a push-pull signal, crosstalk, and the like in high-density recording.

To address the demands, an inorganic recording material is often used in place of the organic coloring material. A recordable optical information recording medium using an inorganic recording material has been being studies but has not been practically used for reasons that compatibility with a ROM having high reflectance is low and an expensive sputter apparatus capable of forming a multilayer film from a material is necessary. However, generally, dependency of an inorganic recording material on the wavelength of a laser beam used is not higher than that of an organic coloring material. In addition, formation of multiple information recording layers (by forming a plurality of information recording layers, the recording capacity of an optical disk is increased by twice or more without enlarging the size) which is often performed in recent years is easily performed more than the case of using the organic coloring material. Consequently, use of the inorganic recording material is becoming the mainstream as the next-generation optical recording material in place of the organic coloring material and is also practically used.

Inorganic recording materials of various types are proposed. For example, a recordable optical information recording medium using a recording layer of a form formed by making two or more thin films made of different metals or half metals in contact with each other is proposed (refer to patent document 1). In the recordable optical information recording medium, a multilayer film is partly alloyed with heat generated by irradiation of a laser beam to form a single film, thereby forming a recording mark. As applications of the method, various forms with different materials are also proposed (refer to, for example, patent document 2). A recordable optical information recording medium using an oxide-based compound for a recording layer is also proposed (refer to, for example, patent documents 3 and 4).

However, it is far from the situation that those media sufficiently satisfy conditions necessary for a recordable optical information recording medium. Specifically, a recordable optical information recording medium is desired to have a characteristic that recorded information is stably stored in an initial state for long time (archival characteristic), a characteristic that a signal is not damaged by a laser beam for reproduction at the time of signal reproduction (reproduction stability), a characteristic that quality is not changed by normal long-term storage and the write characteristic is held (shelf characteristic), and the like. However, it is far from the state that each of the conventional recordable optical information recording media has all of the characteristics. In addition, from the viewpoints of manufacture cost of a recordable optical information recording medium and assurance of a margin in the manufacture process, it is also demanded that the number of layers constructing the recordable optical information recording medium is as small as possible, and the process is simple. Or more specifically, from the viewpoints of the recording/reproduction characteristics, sufficient sensitivity and reaction speed is also demanded so that a recording/reproduction signal which is excellent in a wide range of linear speeds is assured.

There is proposed a recordable optical information recording medium using an inorganic recording material, including a recording layer having a composition expressed by $Sb_aIn_bSn_cZn_dSi_eO_fS_h$ where $a>0$, $b>0$, $c>0$, $d>0$, $e>0$, $f>0$, $h>0$, and $a+b+c+d+e+f+h=100$ (refer to patent document 5). There is also proposed a recordable optical information recording medium using a recording layer having a composition expressed by $Sb_aX_bSn_cZn_dSi_eO_fS_h$ where X is an element selected from In, Ge, Al, Zn, Mn, Cd, Ga, Ti, Si, Te, Nb, Fe, Co, W, Mo, S, Ni, O, Se, Tl, As, P, Au, Pd, Pt, Hf, and V where $a>0$, $b>0$, $c>0$, $d>0$, $e>0$, $f>0$, $h>0$, and $a+b+c+d+e+f+h=100$ (refer to patent document 6).

Further, there is proposed a recordable optical information recording medium having a plurality of information recording layers, using a recording layer containing at least one metal M selected from the group consisting of Ni, Cu, Si, Ti, Ge, Zr, Nb, Mo, In, Sn, W, Pb, Bi, Zn, and La and an element X which is bonded to the metal M by being irradiated with a laser beam for recording, thereby generating crystal of the metal M and the compound (refer to patent documents 7 and 8).

PRIOR ART DOCUMENTS

Patent Documents

Patent document 1: Japanese Unexamined Patent Application Publication No. Sho 62-204442
Patent document 2: Japanese Patent No. 3,066,088
Patent document 3: Japanese Examined Patent Application Publication No. Sho 54-7458
Patent document 4: Japanese Unexamined Patent Application Publication No. 2006-281751
Patent document 5: Japanese Unexamined Patent Application Publication No. 2003-72244

Patent document 6: Japanese Unexamined Patent Application Publication No. 2003-182237
Patent document 7: Japanese Unexamined Patent Application Publication No. 2005-125726
Patent document 8: Japanese Unexamined Patent Application Publication No. 2005-129192

SUMMARY OF THE INVENTION

As described above, it has been difficult to inexpensively obtain a recordable optical information recording medium in which recorded information is stably stored in an initial state for long time, a signal is not damaged by a laser beam for reproduction at the time of signal reproduction, quality is not changed by normal long-term storage, the write characteristic is held, and excellent sensitivity and reaction speed are provided, thereby realizing the recording/reproducing characteristic which is excellent in a wide range of linear speeds and recording power.

In the case of using a recording medium described in the patent documents 5 and 6 as the recording material of an information recording layer which is not in contact with a substrate in a recordable optical information recording medium having a plurality of information recording layers, there are problems such that the degree of modulation in the case of performing recording is low and the number of replayable times is small.

The information recording layer which is not in contact with the substrate in the recordable optical information recording medium having a plurality of information recording layers has to transmit a laser beam for recording/reproducing information to/from the information recording layer which is in contact with the substrate.

The present invention is achieved in consideration of the problems and an object of the invention is to provide an optical information recording medium and a recording/reproducing method therefor, which solve the above-described drawbacks and satisfy the above-described conditions.

The inventors herein have keenly studied in order to solve the problems. As a result, they had an idea of using, in an optical information recording medium having a plurality of information recording layers of two or more kinds between a substrate and a protection layer, a recording layer made of a recording material having a composition satisfying the following equation (1) as one of the information recording layers which are not in contact with the substrate. By the idea, the above-described conditions are satisfied, and actually proved.

  (1)

where $0 < x \leq 1.0$, $0.3 \leq y \leq 0.7$, $0.8 \leq z \leq 1.0$, and X is at least one element selected from the group consisting of Ga, Te, V, Si, Zn, Ta, Sn, and Tb.

That is, an optical information recording medium (the first invention) of the present invention solving the problems has a plurality of information recording layers of two or more kinds between a substrate and a protection layer. At least one information recording layer which is not in contact with the substrate, in the plurality of information recording layers has a recording layer having a composition expressed by

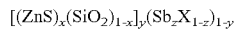

(where $0 < x \leq 1.0$, $0.3 \leq y \leq 0.7$, $0.8 \leq z \leq 1.0$, and X is at least one element selected from the group consisting of Ga, Te, V, Si, Zn, Ta, Sn, and Tb).

In the optical information recording medium, in the case of recording information to at least one information recording layer which is not in contact with the substrate, by irradiation with a laser beam, information is recorded in the recording layer by causing a qualitative change accompanying a change in an optical constant.

The optical information recording medium has, preferably, a dielectric layer provided in contact with at least one side face of the recording layer of at least one information recording layer, or a pair of dielectric layers on both side faces of the recording layer. By the dielectric layers, the recording layer is protected. To obtain excellent recording/reproduction characteristics, the thickness of the recording layer is preferably 3 nm to 40 nm both inclusive. However, the invention is not limited to the thickness.

Typically, a laser beam for recording/reproducing information to/from the at least one information recording layer enters from the protection layer side. However, the invention is not limited to the above. In the case where the laser beam for recording/reproduction enters from the protection layer side, the laser beam for recording/reproducing information to/from the information recording layer which is in contact with the substrate in the plurality of information recording layers has to pass through the at least one information recording layer.

The wavelength of a laser beam for recording/reproducing information to/from the at least one information recording layer in the optical information recording medium is typically 385 nm to 415 nm both inclusive, but the invention is not limited to the wavelength.

The plurality of information recording layers are stacked with an intermediate layer in between.

As information recording layers other than the information recording layer including the recording layer having the composition expressed by the equation (1), in the plurality of information recording layers, a known recordable information recording layer, a rewritable information recording layer, a read-only information recording layer, and the like are used and are selected as necessary.

A recoding/reproducing method for an optical information recording medium according to the present invention (second invention) records/reproduces information by making a laser beam having a wavelength of 385 nm to 415 nm both inclusive enter on the at least one information recording layer in the optical information recording medium of the invention.

In the first and second inventions constructed as described above, the recording layer having the composition expressed by $[(ZnS)_x(SiO_2)_{1-x}]_y(Sb_zX_{1-z})_{1-y}$ has stability and, moreover, has excellent sensitivity and reaction speed to a laser beam, particularly, a laser beam having a wavelength of 385 nm to 415 nm both inclusive.

According to the present invention, the following various effects can be obtained. That is, recorded information is stably stored in an initial state for long time, a signal is not damaged by a laser beam for reproduction at the time of signal reproduction, quality is not changed by normal long-term storage, and the write characteristic is held. The number of layers constructing the optical information recording medium may be small and the manufacture process is simple, so that the manufacture cost of the optical information recording medium and the margin in the manufacture process can be assured. In addition, excellent sensitivity and reaction speed to the laser beam for recording/reproduction is obtained. Consequently, the recording/reproducing characteristic which is excellent in a wide range of linear speeds and recording power is obtained. The optical information recording medium hardly depends on the wavelength of the laser beam for recording/reproduction, does not need initialization, is sufficiently stable also to the power of a laser beam for reproduction, and has high environment reliability. Further, at least one information recording layer which is not in contact with the substrate may transmit the laser beam for recording/reproducing information to/from the information recording layer which is in contact with the substrate.

BEST MODE(S) FOR CARRYING OUT THE INVENTION

Best modes for carrying out the present invention (hereinbelow, called embodiments) will be described below. The description will be given in the following order.
1. First embodiment (optical information recording medium)
2. Second embodiment (optical information recording medium)

1. <First Embodiment>
[Optical Information Recording Medium]

Figure 1:
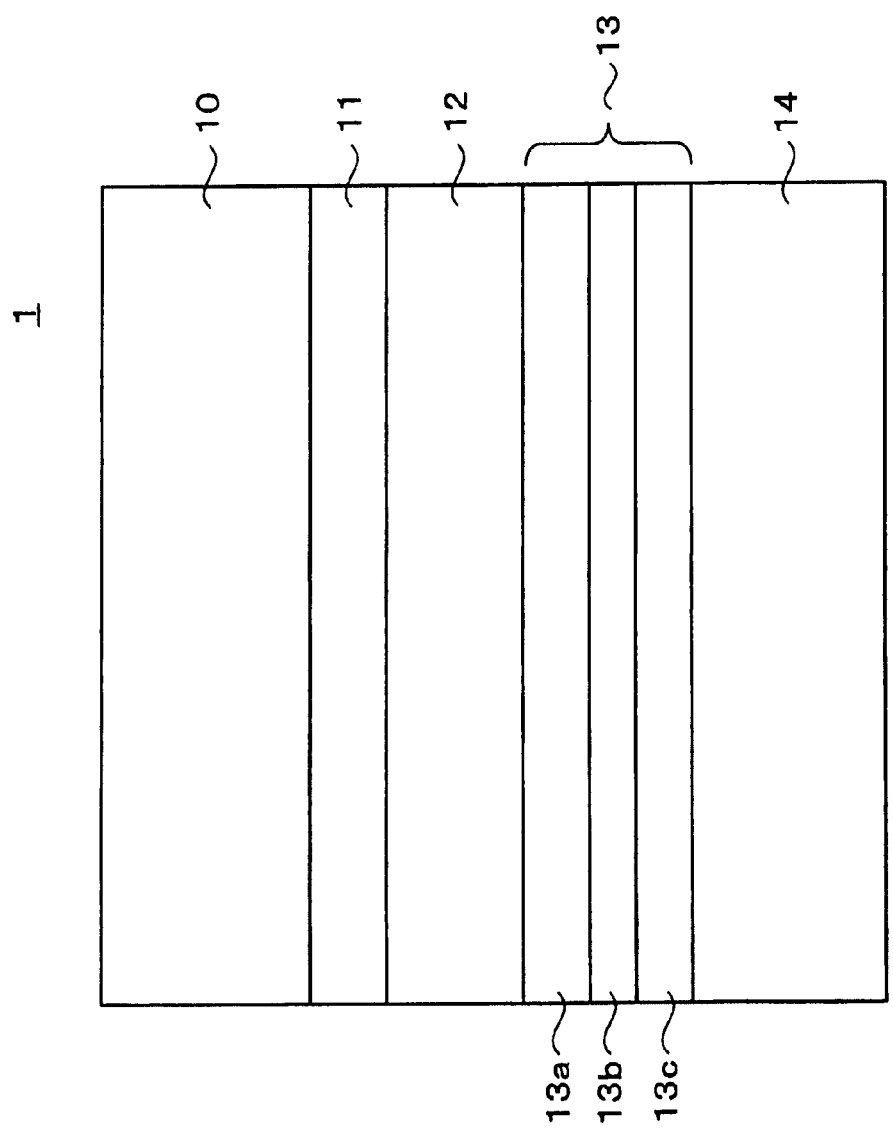
FIG. 1 is a schematic cross section illustrating a main part of an optical information recording medium according to a first embodiment of the present invention.

FIG. 1 illustrates an optical information recording medium 1 according to a first embodiment of the present invention. The optical information recording medium 1 is a two-layer optical information recording medium having two information recording layers.

In the optical information recording medium 1, a first information recording layer 11, an intermediate layer 12, a second information recording layer 13, and a protection layer 14 are sequentially stacked on a substrate 10. The second information recording layer 13 includes a first dielectric layer 13a, a recording layer 13b, and a second dielectric layer 13c sequentially stacked on the intermediate layer 12.

Information is recorded/reproduced to/from the optical information recording medium 1 by making a laser beam, for example, a laser beam having a wavelength of 385 nm to 415 nm both inclusive enter/emit from the protection layer 14 side. The optical information recording medium 1 typically has a disc shape but is not limited to the shape.

The material, thickness, forming method, and the like of the substrate 10 may be arbitrarily selected as long as desired characteristics are provided. As the material used for the substrate 10, a plastic material such as polycarbonate or acrylic-based resin is preferable from the viewpoint of cost. However, the material is not limited to the plastic material but another material such as glass may be used. In the case where the laser beam for recording/reproduction enters from the protection layer 14 side as described above, the substrate 10 does not have to be transparent. Consequently, a non-transparent material such as metal may be used as the material of the substrate 10. In the case of using the plastic material for the substrate 10, for formation of the substrate 10, for example, the injection molding method, the photopolymer method (2P method) using ultraviolet curable resin, or the like may be used. The material and the formation method of the substrate 10 are not limited to the above-described material and method but may be arbitral as long as a desired shape (for example, a disc shape having a thickness of 1.1 mm and a diameter of 120 mm) and optical smoothness in the surface of the substrate 10 are sufficiently assured. The thickness of the substrate 10 is not limited but is preferably 0.3 mm to 1.3 mm both inclusive. When the thickness of the substrate 10 is less than 0.3 mm, the intensity of the optical information recording medium 1 decreases, and the optical information recording medium 1 tends to be warped. On the other hand, when the thickness of the substrate 10 is thicker than 1.3 mm, the thickness of the optical information recording medium 1 becomes thicker than the thickness of 1.2 mm of a CD or DVD. There is consequently the possibility that, in the case of constructing a drive apparatus for recording/reproduction supporting all of the media, the same disk tray is not commonly used.

Concave-convex groove tracks, pits, or the like may be formed in a surface on the side in which the first information recording layer 11 of the substrate 10 is formed. It enables a laser beam for recording and reproduction to be guided by the groove to an arbitrary position on the first information recording layer 11 or address information to be obtained. As the groove shape, various shapes such as a spiral shape, a concentric shape, a pit sequence, and the like are applicable. The first information recording layer 11 may be a recordable or rewritable information recording layer or a read-only information recording layer and is made of a known material.

The intermediate layer 12 is provided to separate the first information recording layer 11 and the second information recording layer 13 from each other and is made of a material having no absorption in the wavelength range of the laser beam for recording/reproduction. The thickness of the intermediate layer 12 is selected as necessary, for example, selected from 20 μm to 30 μm. However, the thickness is not limited to 20 μm to 30 μm. As the material having no absorption in the wavelength range of the laser beam for recording/reproduction, for example, a light curing material such as an ultraviolet curable resin having no absorption in the wavelength range of the laser beam for recording/reproduction after curing may be used. Concretely, the intermediate layer 12 may be formed by, for example, coating an ultraviolet curable resin having no absorption in the wavelength range of the laser beam for recording/reproduction after curing to a desired thickness by a spin coater or the like and, after that, irradiating the resin with ultraviolet light so as to be cured. Alternately, the intermediate layer 12 may be formed by adhering a light curable PSA (Pressure Sensitive Adhesive) having no absorption in the wavelength range of the laser beam for recording/reproduction after curing and irradiating the adhesive with ultraviolet light so as to be cured. The concavo-convex groove tracks may be transferred by using the concavo-convex groove tracks after irradiation of ultraviolet rays. It enables a laser beam for recording and reproduction to be guided by the groove to an arbitrary position on the second information recording layer 13 or address information to be obtained. As the groove shape, various shapes such as a spiral shape, a concentric shape, a pit sequence, and the like are applicable.

The recording layer 13b of the second information recording layer 13 has a composition satisfying the above-described equation (1). Preferably, sputtering is used as a method of forming the recording layer 13b. However, the method is not limited to sputtering. The first and second dielectric layers 13a and 13c of the second information recording layer 13 are provided to protect the recording layer 13b and to control the optical characteristics and thermal characteristics at the time of recording/reproduction. As the material of the first and second dielectric layers 13a and 13c, a dielectric which may be generally used in a conventionally known optical disk such as SiN, ZnS—$SiO_2$, $Ta_2O_5$, or the like may be arbitrarily selected according to desired characteristics and used. Each of the first and second dielectric layers 13a and 13c may be made of a plurality of kinds of dielectrics.

The second information recording layer 13 including the first dielectric layer 13a, the recording layer 13b, and the second dielectric layer 13c has transparency sufficiently high so that the first information recording layer 11 is recorded/reproduced with the laser beam for recording/reproduction through the second information recording layer 13.

In the case of making the laser beam for recording/reproduction enter from the protection layer 14 side as described above, desirably, the protection layer 14 does not have capability of absorbing the laser beam. Concretely, for example, it is preferable to set the thickness of the protection layer 14 to 0.3 mm or less and select, as the material of the protection layer 14, a material having transmittance with respect to the laser beam for recording/reproduction of 90% or higher. In particular, by setting the thickness of the protection layer 14 to 3 to 177 μm and combining the thickness with high numerical aperture NA (for example, 0.85) of a lens in a recording/reproduction optical system of the drive apparatus for recording/reproduction in the optical information recording medium 1, high-density recording is realized.

As long as the above-described condition is satisfied, the configuration and the formation method of the protection layer 14 are not limited. Concretely, the protection layer 14 may be formed by, for example, coating an ultraviolet curable resin having no absorption in the wavelength range of the laser beam for recording/reproduction after curing to a desired thickness of 0.3 mm or less (for example, 0.1 mm) by a spin coater or the like and, after that, irradiating the resin with ultraviolet light so as to be cured. Alternately, the protection layer 14 may be formed by mounting a light-transmitting sheet (film) which has a thickness of 0.3 mm or less, is made of a plastic material such as polycarbonate resin or acrylic resin, and is optically sufficiently smooth on an ultraviolet-curable-type adhesive coated by spin coating to a thickness of 5 to 15 μm both inclusive, and irradiating the sheet with ultraviolet light. Alternately, the protection layer 14 may be formed by adhering the light-transmitting sheet by an adhesive such as PSA (Pressure Sensitive Adhesive).

Further, as necessary, to prevent adhesion of dust to the surface of the protection layer 14 or scratch in the surface, a protection layer (not shown) made of an organic or inorganic material may be formed on the surface of the protection layer 14. For the protection layer, desirably, a material hardly having capability of absorbing the laser beam for recording/reproduction is used.

EXAMPLE 1

The optical information recording medium 1 for performing recording and reproduction by an optical disk recording/reproducing apparatus using a two-group objective lens having a numerical aperture of 0.85 and a semiconductor laser source that emits a laser beam having a wavelength of 405 nm was manufactured as follows.

As the substrate 10, a polycarbonate substrate having a thickness of 1.1 mm and having a groove with a track pitch of 0.32 μM on one side was manufactured by injection molding. The first information recording layer 11 was formed on the polycarbonate substrate. An adhesive of an ultraviolet curable type was coated on the first information recording layer 11 to a thickness of 25 μm by spin coating. A groove track was transferred by a stamper made of polycarbonate. The adhesive was irradiated with ultraviolet light to form the intermediate layer 12. On the intermediate layer 12, a $Ta_2O_5$ film having a thickness of 10 nm as the first dielectric layer 13a, the recording layer 13b having a thickness of 10 nm and a $Ta_2O_5$ film having a thickness of 30 nm as the second dielectric layer 13c were sequentially formed by sputtering, thereby forming the second information recording layer 13. The protection layer 14 was formed on the second information recording layer 13. In such a manner, the optical information recording medium 1 of Example 1 was manufactured.

At the time of forming the recording layer 13b by sputtering, a single-body target prepared by mixing ZnS, $SiO_2$, Sb, and Ga was used. Co-sputtering was performed in a state where Ar gas of 95 sccm was passed to form the recording layer 13b having a composition expressed by the equation (1) where x=0.8, y=0.35, and z=0.8.

The optical information recording medium 1 manufactured as described above was evaluated. For the evaluation, ODU-1000 (having a laser beam wavelength of 405 nm) manufactured by Pulstec Industrial Co., Ltd., the spectrum analyzer R3267 manufactured by Advantest Corporation, the jitter analyzer LE1876 manufactured by Leader Electronics Corp., and the like were used. Signal evaluation of the optical information recording medium 1 was made with linear speed of 4.92 m/s and channel bit length of 74.50 nm conformed with the standard of Blu-ray Disc DL 50 GB density. Signal recording was performed with linear speed of 4.92 m/s, 2× linear speed of 9.84 m/s, and 4× linear speed of 19.68 m/s.

The optical information recording medium 1 was subjected to recording/reproduction evaluation. At reflectance of 4.8% and linear speed of 4.92 m/s, jitter was 6.5% at a recording power of 7.1 mW. When the degree of modulation was defined by (I8H−I8L)/I8H for signal level I8H in an 8T space part and signal level I8L in the 8T mark part, the value was 47%, and very good recording/reproducing characteristic was expressed.

At the 2× linear speed of 9.84 m/s, the jitter was 6.3% and the degree of modulation was 42% at the recording power of 8.4 mW. At the 4× linear speed of 19.68 m/s, the jitter was 6.6% and the degree of modulation was 44% at the recording power of 10.0 mW.

Figure 2:
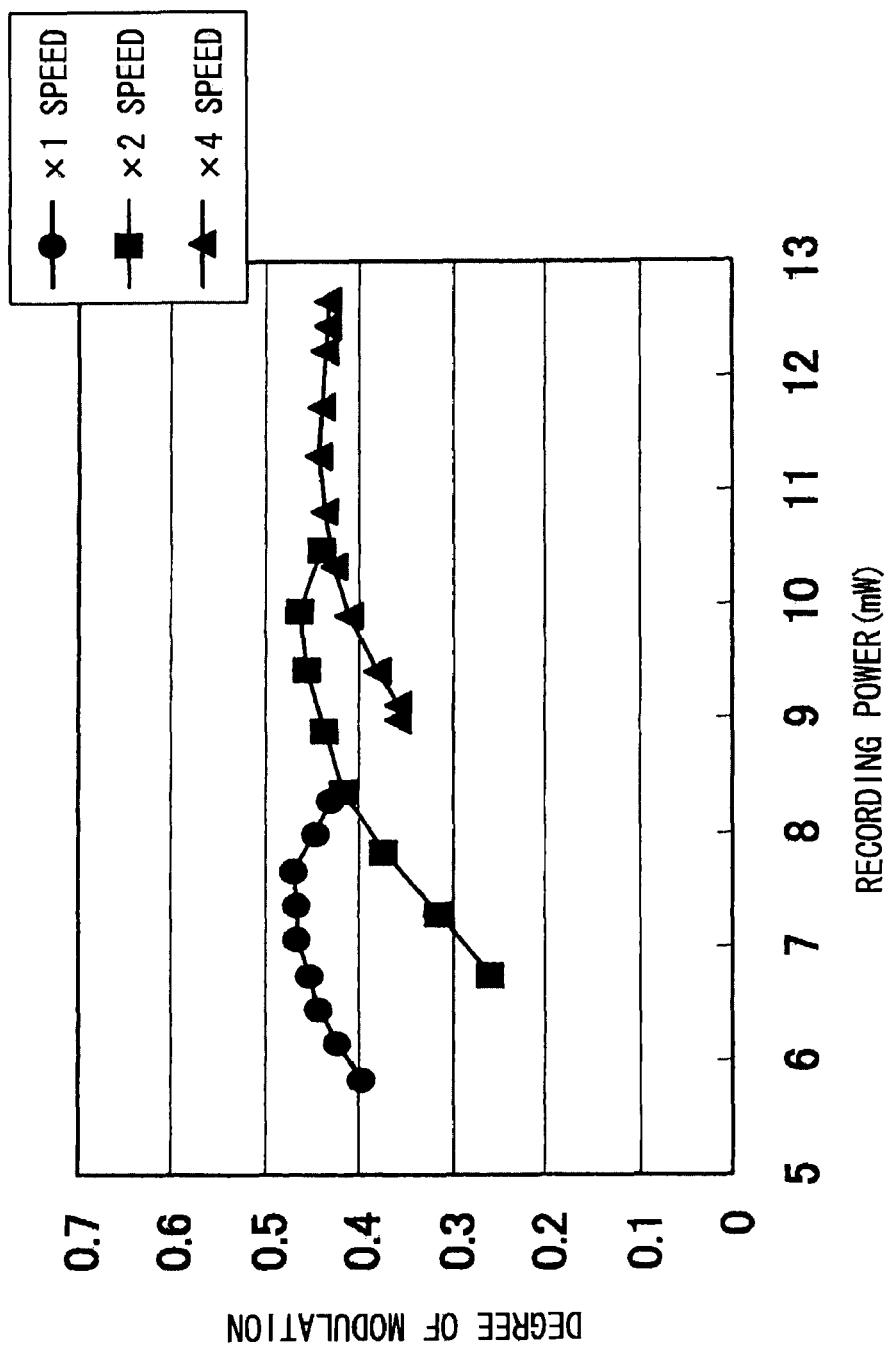
FIG. 2 is a schematic diagram illustrating changes in the degree of modulation with respect to recording power of an optical information recording medium according to example 1.
Figure 3:
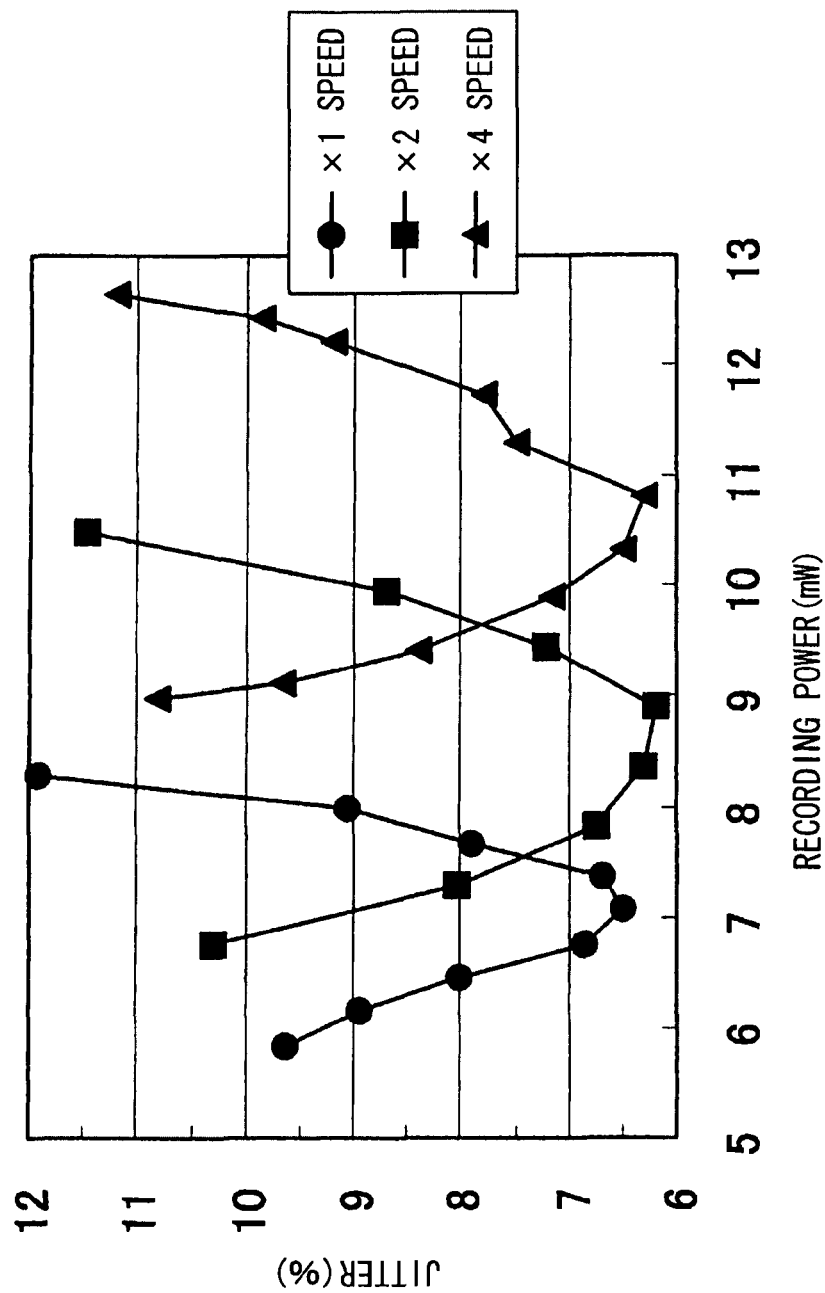
FIG. 3 is a schematic diagram illustrating changes in jitter with respect to the recording power of the optical information recording medium according to the example 1.
Figure 4:
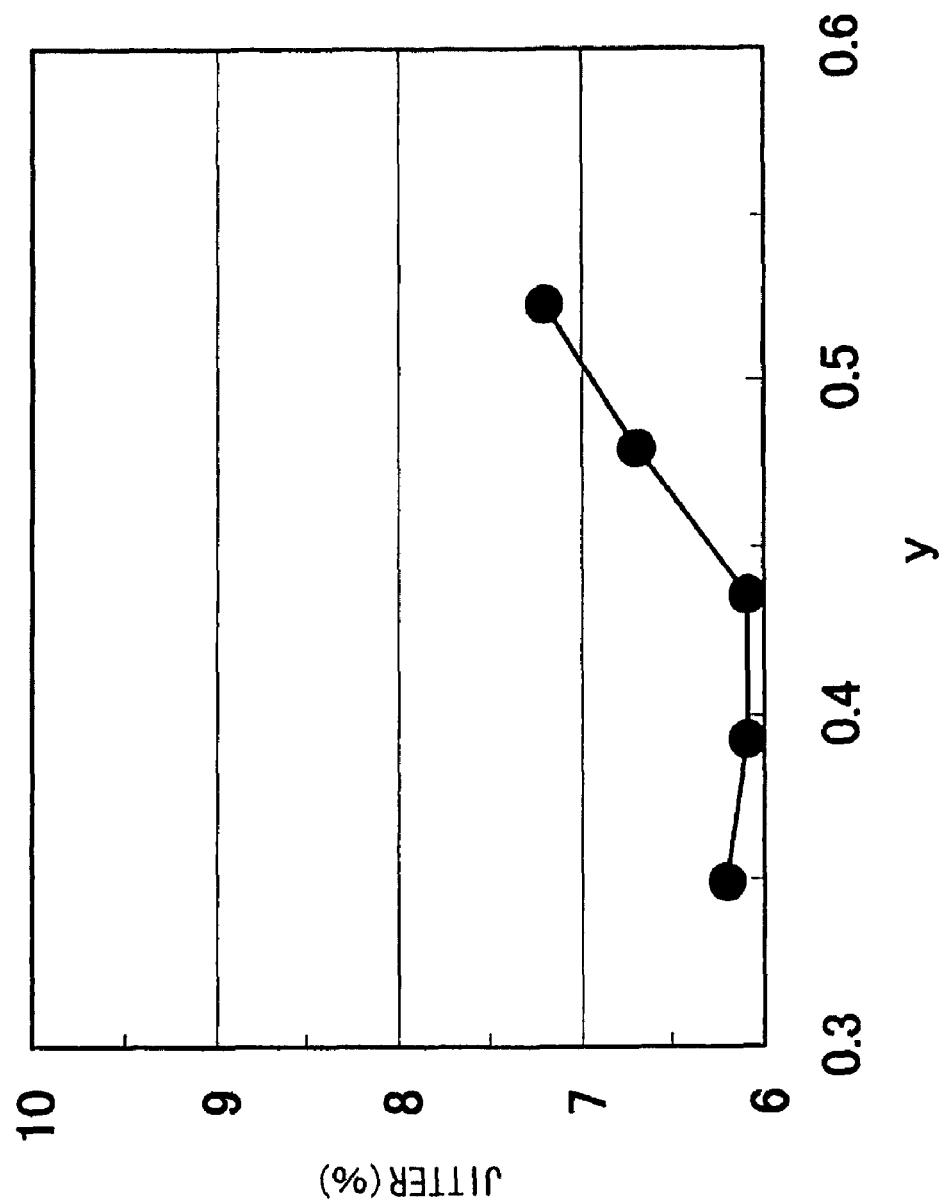
FIG. 4 is a schematic diagram illustrating the relation between the composition of a recording layer in the optical information recording medium according to the example 1 and a recording/reproducing characteristic.

The result of the recording/reproduction evaluation is shown in FIGS. 2 and 3. As understood from FIG. 2, the optical information recording medium 1 has high recording sensitivity at any linear speeds, and very good recording/reproducing characteristic. As understood from FIG. 3, as a margin in the recording power fluctuation, in the case where the jitter of 10.5% is set as the upper limit, the power fluctuation of about ±15% is allowed at any linear speed. The optical information recording medium 1 has sufficiently wide power margin. FIG. 4 shows changes in the jitter when "y" is changed in the case where the composition of the recording layer 13*b* is expressed by the equation (1). As shown in FIG. 4, by changing the composition of the recording layer 13*b*, the recording/reproduction characteristic may be changed.

Predetermined recording was performed on the optical information recording medium 1, and the optical information recording medium 1 was put in a constant temperature and humidity bath of 80° C. and 85% RH. After lapse of 400 hours, measurement of the recording/reproduction characteristic was performed in a manner similar to the above. As a result, any of measurement values of the reflectance, recording density, the degree of modulation, and jitter are the same as those before the optical information recording medium 1 was put in the bath. It was therefore clarified that the optical information recording medium 1 holds the excellent characteristics for long time even in severe environments.

Predetermined recording was performed on the optical information recording medium 1, and reproduction was executed under reproduction power conditions stricter than normal conditions. As a result, even after information was reproduced one million times at the 4× linear speed 19.68 m/s and 1.2 mW, an error did not change. It was therefore clarified that the optical information recording medium 1 holds the excellent recording state for long time also at the time of repeated replay.

Comparative Example

An optical information recording medium of a comparative example using a usual SbInSn-based recording material described in Patent documents 5 and 6 in place of the recording material having the composition expressed by the equation (1) as the material of the recording layer 13*b* in the second information recording layer 13 of the optical information recording medium 1 of Example 1 was compared with the optical information recording medium 1 of the first embodiment having the recording layer 13*b* made of the material obtained by mixing Sb and Ga in addition to ZnS and $SiO_2$.

For the evaluation, in a manner similar to the first embodiment, ODU-1000 (having a laser beam wavelength of 405 nm) manufactured by Pulstec Industrial Co., Ltd., the spectrum analyzer R3267 manufactured by Advantest Corporation, the jitter analyzer LE1876 manufactured by Leader Electronics Corp., and the like were used.

Figure 5:
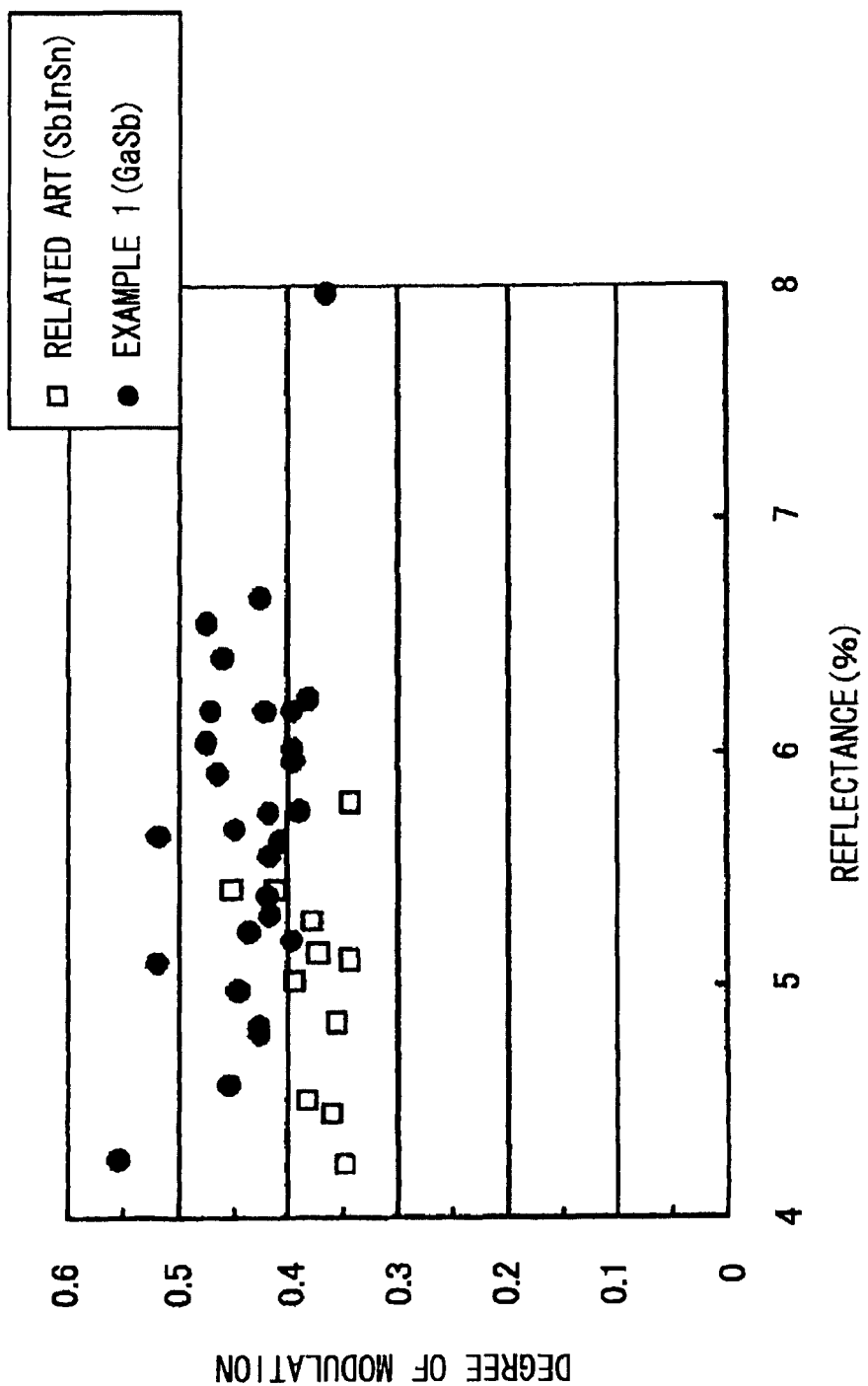
FIG. 5 is a schematic diagram illustrating changes in the degree of modulation with respect to reflectance of the optical information recording medium according to the example 1.

Recording was performed with linear speed of 9.84 m/s which is double as the linear speed of 4.92 m/s conformed with the standard of 50 GB density, and a channel bit length of 74.50 nm. FIG. 5 shows changes in the degree of modulation with respect to reflectance of the conventional optical information recording medium which performs recording as described above and the optical information recording medium. As understood from FIG. 5, the degree of modulation in the optical information recording medium of the comparative example using the recording materials described in the patent documents 5 and 6 is less than 40% and is low. In contrast, the degree of modulation in the optical information recording medium 1 of the first embodiment using the recording materials having the composition expressed by the equation (1) is 40 to 55% and is high. The superiority of the optical information recording medium 1 of Example 1 is obvious.

Figure 6:
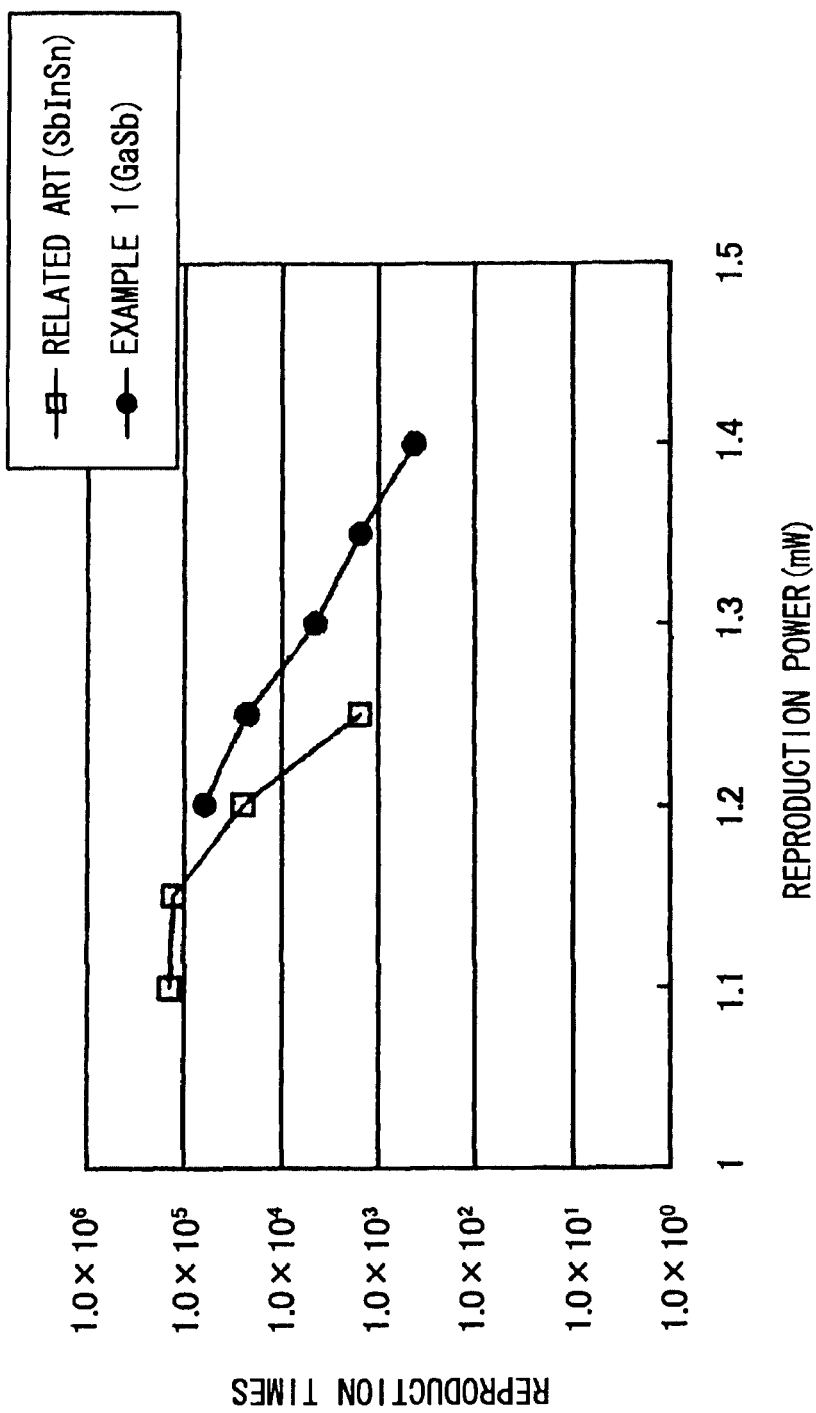
FIG. 6 is a schematic diagram illustrating changes in the number of reproduction times with respect to reproduction power of the optical information recording medium according to the example 1.

Predetermined recording was performed on the optical information recording medium of the comparative example and the optical information recording medium 1. After that, reproduction was executed under reproduction power conditions stricter than normal conditions at linear speed of 4.92 m/s. FIG. 6 illustrates changes in the number of reproduction times when the bit error rate becomes $1 \times 10^{-4}$ or higher for the reproduction power of the optical information recording medium of the comparative example and the optical information recording medium 1 from which information was reproduced. As understood from FIG. 6, the number of reproducible repetition times of the optical information recording medium 1 of Example 1 is larger than that of the optical information recording medium of the comparative example using the recording materials described in the patent documents 5 and 6, and superiority of the optical information recording medium 1 of Example 1 is obvious.

As described above, according to the first embodiment, since the recording layer 13*b* in the second information recording layer 13 has the composition of the equation (1), the two-layer recordable optical information recording medium is obtained at low cost in which recorded information is stably stored for long in the initial state, signals are not deteriorated by a laser beam for reproduction at the time of signal reproduction, the quality does not change in normal long-term storage, the write characteristic is also held, excellent sensitivity and reaction speed is provided, and the excellent recording/reproducing signal characteristics are realized in the wide range of linear speeds and recording powers. The laser beam for recording/reproduction information to/from the first information recording layer 11 which is in contact with the substrate 10 is allowed to pass through the second information layer 13 and enters the first information recording layer 11. Recording and reproduction of the first information recording layer 11 is performed without hindrance. The recordable optical information recording medium is suitably applied to the case of using a laser beam having a wavelength of, for example, 385 nm to 415 nm both inclusive for recording/reproduction.

2. Second Embodiment

[Optical Information Recording Medium]

Figure 7:
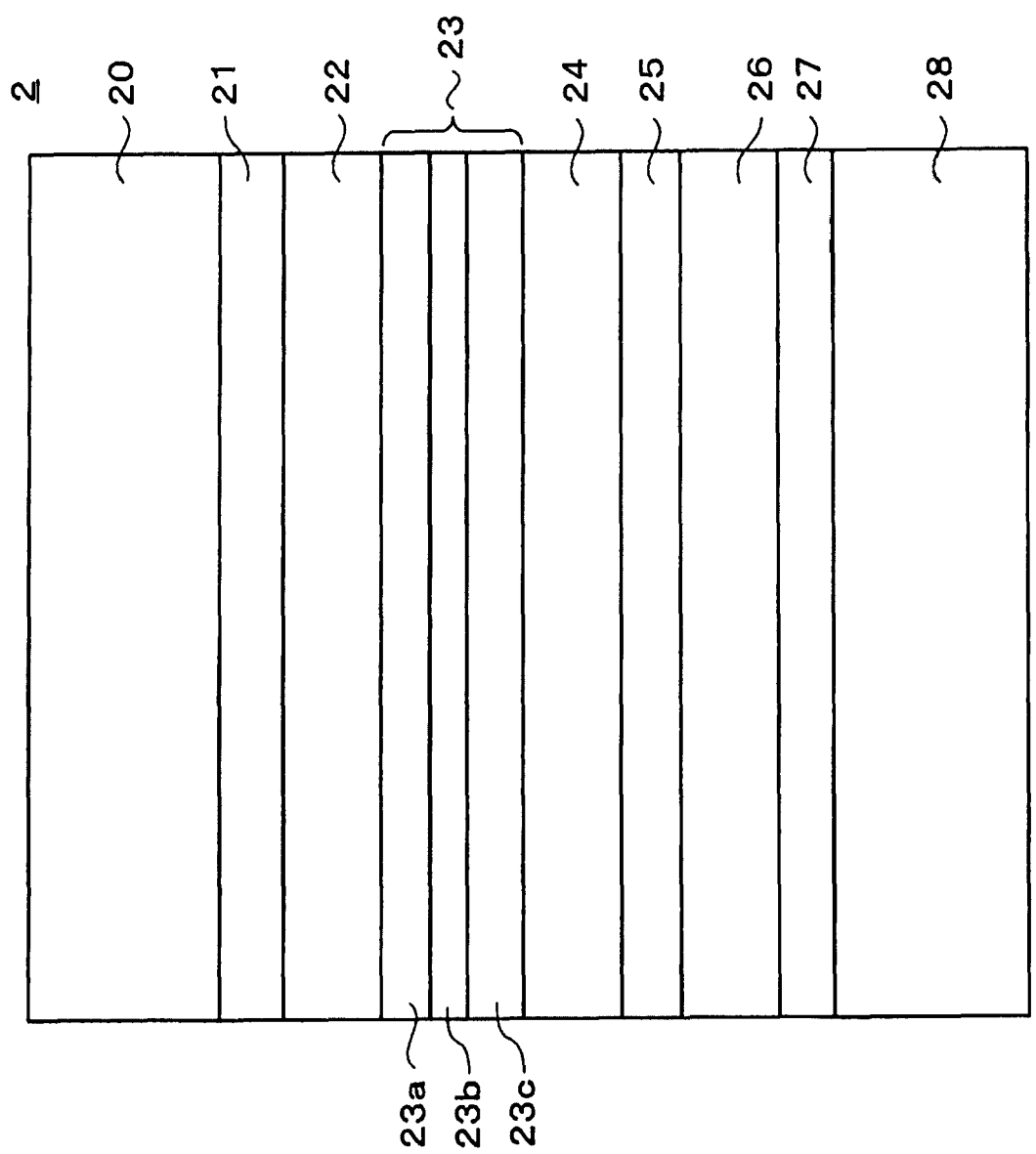
FIG. 7 is a schematic cross section illustrating a main part of an optical information recording medium according to a second embodiment of the invention.

FIG. 7 shows an optical information recording medium 2 according to a second embodiment of the invention. The optical information recording medium 2 is a four-layer optical information recording medium having four information recording layers. In the optical information recording medium 2, a first information recording layer 21, an intermediate layer 22, a second information recording layer 23, a second intermediate layer 24, a third information recording layer 25, a third intermediate layer 26, a fourth information recording layer 27, and a protection layer 28 are sequentially stacked on a substrate 20. The second information recording layer 23 is made of a first dielectric layer 23*a*, a recording layer 23*b*, and a second dielectric layer 23*c* sequentially stacked on the first intermediate layer 22.

Information is recorded/reproduced to/from the optical information recording medium 2 by making a laser beam, for example, a laser beam having a wavelength of 385 nm to 415 nm both inclusive enter/emit from the protection layer 28 side. The optical information recording medium 2 typically has a disc shape but is not limited to the shape.

The material, thickness, forming method, and the like of the substrate 20 may be arbitrarily selected as long as desired characteristics are provided. As the material used for the substrate 20, a plastic material such as polycarbonate or acrylic-based resin is preferable from the viewpoint of cost. However, the material is not limited to the plastic material but may be another material such as glass. In the case where the laser beam for recording/reproduction enters from the protection layer 28 side as described above, the substrate 20 does not have to be transparent. Consequently, a non-transparent material such as metal may be used as the material of the substrate 20. In the case of using the plastic material for the substrate 20, for formation of the substrate 20, for example, the injection molding method, the photopolymer method (2P method) using ultraviolet curable resin, or the like may be used. The material and the formation method of the substrate 20 are not limited to the above-described material and method but may be arbitral as long as a desired shape (for example, a disc shape having a thickness of 1.1 mm and a diameter of 120 mm) and optical smoothness in the surface of the substrate 20 are sufficiently assured. The thickness of the substrate 20 is not limited but is preferably 0.3 mm to 1.3 mm both inclusive. When the thickness of the substrate 20 is less than 0.3 mm, the intensity of the optical information recording medium 2 decreases, and the optical information recording medium 2 tends to be warped. On the other hand, when the thickness of the substrate 20 is thicker than 1.3 mm, the thickness of the optical information recording medium 2 becomes thicker than the thickness of 1.2 mm of a CD or DVD. There is consequently the possibility that, in the case of constructing a drive apparatus for recording/reproduction supporting all of the media, the same disk tray is not commonly used.

Further, concavo-convex groove tracks, pits, or the like may be formed in a surface on the side where the first information recording layer 21 of the substrate 20 is formed. It enables a laser beam for recording and reproduction to be guided by the groove to an arbitrary position on the first information recording layer 21 or address information to be obtained. As the groove shape, various shapes such as a spiral shape, a concentric shape, a pit sequence, and the like are applicable.

The first, third, and fourth information recording layers 21, 25, and 27 may be recordable or rewritable information recording layers or read-only information recording layers and are made of a known material.

The first intermediate layer 22 is provided to separate the first information recording layer 21 and the second information recording layer 23 from each other. The second intermediate layer 24 is provided to separate the second information recording layer 23 and the third information recording layer 25 from each other. The third intermediate layer 26 is provided to separate the third information recording layer 25 and the fourth information recording layer 27 from each other. The first, second, and third intermediate layers 22, 24, and 26 are made of a material having no absorption in the wavelength range of the laser beam for recording/reproduction. The thickness of the first, second, and third intermediate layers 22, 24, and 26 are selected as necessary, for example, selected from 10 μm to 30 μm both inclusive. However, the thickness is not limited to 10 μm to 30 μm. As the material having no absorption in the wavelength range of the laser beam for recording/reproduction, for example, a light curing material such as an ultraviolet curable resin having no absorption in the wavelength range of the laser beam for recording/reproduction after curing may be used. Concretely, the first, second, and third intermediate layers 22, 24, and 26 may be formed by, for example, coating an ultraviolet curable resin having no absorption in the wavelength range of the laser beam for recording/reproduction after curing to a desired thickness by a spin coater or the like and, after that, irradiating the resin with ultraviolet light so as to be cured. Alternately, the first, second, and third intermediate layers 22, 24, and 26 may be formed by adhering a light curable PSA (Pressure Sensitive Adhesive) having no absorption in the wavelength range of the laser beam for recording/reproduction after curing and irradiating the adhesive with ultraviolet light so as to be cured.

The recording layer 23b of the second information recording layer 23 has a composition satisfying the above-described equation (1). Preferably, sputtering is used as a method of forming the recording layer 23b. However, the method is not limited to sputtering. The first and second dielectric layers 23a and 23c of the second information recording layer 23 are provided to protect the recording layer 23b and to control the optical characteristics and thermal characteristics at the time of recording/reproduction. As the material of the first and second dielectric layers 23a and 23c, a dielectric which may be generally used in a conventionally known optical disk such as SiN, ZnS—SiO$_2$, Ta$_2$O$_5$, or the like may be arbitrarily selected according to desired characteristics and used. Each of the first and second dielectric layers 23a and 23c may be made of a plurality of kinds of dielectrics.

In the case of making the laser beam for recording/reproduction enter from the protection layer 28 side as described above, desirably, the protection layer 28 does not have capability of absorbing the laser beam. Concretely, for example, it is preferable to set the thickness of the protection layer 28 to 0.3 mm or less and select, as the material of the protection layer 28, a material having transmittance with respect to the laser beam for recording/reproduction of 90% or higher. In particular, by setting the thickness of the protection layer 28 to 3 to 177 μm both inclusive and combining the thickness with high numerical aperture NA (for example, 0.85) of a lens in a recording/reproduction optical system of the drive apparatus for recording/reproduction in the optical information recording medium 2, high-density recording is realized.

As long as the condition is satisfied, the configuration and the formation method of the protection layer 28 are not limited. Concretely, the protection layer 28 may be formed by, for example, coating an ultraviolet curable resin having no absorption in the wavelength range of the laser beam for recording/reproduction after curing to a desired thickness of 0.3 mm or less (for example, 0.1 mm) by a spin coater or the like and, after that, irradiating the resin with ultraviolet light so as to be cured. Alternately, the protection layer 28 may be formed by mounting a light-transmitting sheet (film) which has a thickness of 0.3 mm or less, is made of a plastic material such as polycarbonate resin or acrylic-based resin, and is optically sufficiently smooth on an ultraviolet-curable-type adhesive coated by spin coating, and irradiating the sheet with ultraviolet light. Alternately, the protection layer 28 may be formed by adhering the light-transmitting sheet by an adhesive such as PSA (Pressure Sensitive Adhesive).

Further, as necessary, to prevent adhesion of dust to the surface of the protection layer 28 or scratch in the surface, a protection layer (not shown) made of an organic or inorganic material may be formed on the surface of the protection layer 28. For the protection layer, desirably, a material hardly having capability of absorbing the laser beam for recording/reproduction is used.

EXAMPLE 2

The optical information recording medium 2 for performing recording and reproduction by an optical disk recording/reproducing apparatus using a two-group objective lens having a numerical aperture of 0.85 and a semiconductor laser source that emits a beam having a wavelength of 405 nm was manufactured as follows.

As the substrate 20, a polycarbonate substrate having a thickness of 1.1 mm and having a groove with a track pitch of 0.32 μm on one side was manufactured by injection molding. The first information recording layer 11 was formed on the polycarbonate substrate. The first intermediate layer 22 having a thickness of 15 μm was formed by the method described in Example 1 on the first recording layer 11. On the first intermediate layer 22, a $Ta_2O_5$ film having a thickness of 10 nm as the first dielectric layer 23a, the recording layer 23b having a thickness of 7 nm, and a $Ta_2O_5$ film having a thickness of 26 nm as the second dielectric layer 23c were sequentially formed by sputtering, thereby forming the second information recording layer 23. On the second information recording layer 23, the second intermediate layer 24, the third information recording layer 25, the third intermediate layer 26, the fourth information recording layer 27, and the protection layer 28 were sequentially formed. In such a manner, the optical information recording medium 2 of Example 1 was manufactured. The second and third intermediate layers 24 and 26 are formed by a method similar to that of the first intermediate layer 22.

At the time of forming the recording layer 23b by sputtering, a single-body target prepared by mixing ZnS, $SiO_2$, Sb, and Ga was used. Co-sputtering was performed in a state where Ar gas of 95 sccm was passed to form the recording layer 23b having a composition expressed by the equation (1) where x=0.8, y=0.35, and z=0.8.

The optical information recording medium 2 manufactured as described above was evaluated. For the evaluation, ODU-1000 (having a laser beam wavelength of 405 nm) manufactured by Pulstec Industrial Co., Ltd., the spectrum analyzer R3267 manufactured by Advantest Corporation, the jitter analyzer LE1876 manufactured by Leader Electronics Corp., and the like were used, as in Example 1. When recording/reproduction evaluation of the second information recording layer 23 was made at linear speed of 4.92 m/s and with a channel bit length of 74.50 nm, reflectance was 2.9% and jitter was 6.85% at a recording power of 9.1 mW. When the degree of modulation was defined by (I8H−I8L)/I8H for signal level I8H in an 8T space part and signal level I8L in the 8T mark part, the value was 46%, and very good recording/reproducing characteristic was expressed.

Figure 8:
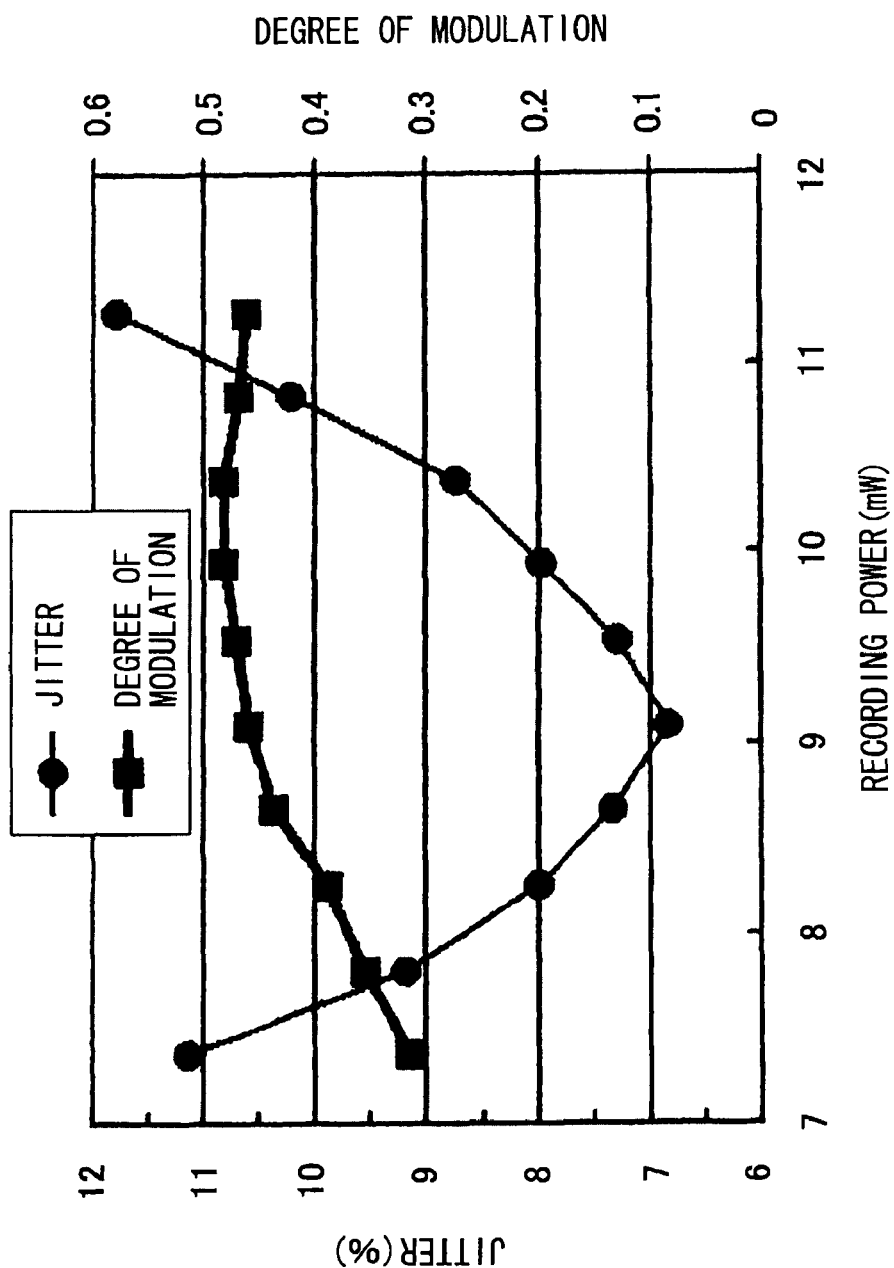
FIG. 8 is a schematic diagram illustrating changes in jitter and the degree of modulation with respect to recording power of an optical information recording medium according to example 2.

The result of the recording/reproduction evaluation is shown in FIG. 8. As understood from FIG. 8, as a margin in the recording power fluctuation, in the case where the jitter of 10.5% is set as the upper limit, the power fluctuation of about ±15% is allowed at any linear speed. The optical information recording medium 2 has sufficiently wide power margin.

Predetermined recording was performed on the optical information recording medium 2 of Example 2, and the optical information recording medium 2 was put in a constant temperature and humidity bath of 80° C. and 85% RH. After lapse of 460 hours, measurement of the recording/reproduction characteristic was performed in a manner similar to the above. As a result, any of measurement values of the reflectance, recording sensitivity, the degree of modulation, and jitter are the same as those before the optical information recording medium 2 was put in the bath. It was therefore clarified that the optical information recording medium 2 holds the excellent characteristics for long time even in severe environments.

According to the second embodiment, the four-layer recordable optical information recording medium having advantages similar to those of the first embodiment are obtained at low cost.

The embodiments and examples of the present invention have been concretely described above. However, the present invention is not limited to the foregoing embodiments and examples but various modifications based on the technical idea of the present invention are possible. For example, the numerical values, materials, structures, shapes and the like mentioned in the first and second embodiments and Examples 1 and 2 are just examples. As necessary, numerical values, materials, structures, shapes, and the like different from the above may be also used.

The invention claimed is:

1. An optical information recording medium having a plurality of information recording layers of two or more kinds between a substrate and a protection layer, wherein
at least one information recording layer which is not in contact with the substrate, in the plurality of information recording layers, and which is separated from the substrate by at least one other layer of the plurality of information recording layers, has a recording layer having a composition expressed by:

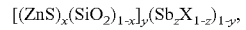

in which
$0 < x \leqq 1.0$, $0.3 \leqq y \leqq 0.7$, $0.8 \leqq z \leqq 1.0$, and
X is at least one element selected from the group consisting of Ga, Te, V, Si, Zn, Ta, Sn, and Tb.

2. The optical information recording medium according to claim 1, wherein the at least one information recording layer has a dielectric layer provided in contact with at least one side face of the recording layer.

3. The optical information recording medium according to claim 2, wherein the at least one information recording layer has a pair of dielectric layers provided in contact with both sides of the recording layer.

4. The optical information recording medium according to claim 3, wherein a thickness of the recording layer is 3 nm to 40 nm both inclusive.

5. The optical information recording medium according to claim 4, wherein a laser beam for recording/reproducing information to/from the at least one information recording layer enters from the protection layer side.

6. The optical information recording medium according to claim 5, wherein a laser beam for recording/reproducing information to/from an information recording layer which is in contact with the substrate, in the plurality of information recording layers passes through the at least one information recording layer.

7. The optical information recording medium according to claim 6, wherein wavelength of a laser beam for recording/reproducing information to/from the at least one information recording layer is 385 nm to 415 nm both inclusive.

8. The optical information recording medium according to claim 7, wherein the plurality of information recording layers are stacked with an intermediate layer in between.

9. A recording/reproducing method for an optical information recording medium having a plurality of information recording layers of two or more kinds between a substrate and a protection layer, at least one information recording layer which is not in contact with the substrate, in the plurality of information recording layers, and which is separated from the substrate by at least one other layer of the plurality of information recording layers, having a recording layer of a composition expressed by:

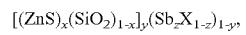

in which
$0 < x \leqq 1.0$,
$0.3 \leqq y \leqq 0.7$,
$0.8 \leqq z \leqq 1.0$, and X is at least one element selected from the group consisting of Ga, Te, V, Si, Zn, Ta, Sn, and Tb, the method comprising recording and/or reproducing information by making a laser beam having a wavelength of 385 nm to 415 nm both inclusive enter the at least one information recording layer in the optical information recording medium.

10. The recording/reproducing method for an optical information recording medium according to claim 9, wherein the laser beam is made to enter the at least one information recording layer from the protection layer side.

11. The recording/reproducing method for an optical information recording medium according to claim 9, wherein X is Ga, and x =0.8, y =0.35, and z =0.8.

12. The optical information recording medium according to claim 1, wherein X is Ga, and x =0.8, y =0.35, and z =0.8.

* * * * *